United States Patent [19]
Iguchi

[11] Patent Number: 5,034,734
[45] Date of Patent: Jul. 23, 1991

[54] SMALL-SIZED EQUIPMENT CAPABLE OF AUTOMATICALLY CHANGING THE VISUAL ANGLE OF ITS LIQUID CRYSTAL DISPLAY

[75] Inventor: Kazuaki Iguchi, Tokyo, Japan
[73] Assignee: NEC Corporation, Japan
[21] Appl. No.: 310,550
[22] Filed: Feb. 13, 1989
[30] Foreign Application Priority Data
Feb. 16, 1988 [JP] Japan .................................. 63-31884
[51] Int. Cl.⁵ .............................................. G09G 3/18
[52] U.S. Cl. ..................................... 340/765; 340/784
[58] Field of Search ............... 340/765, 784, 805, 811; 379/96, 142, 59, 63, 376, 396, 433; 350/331 R, 332, 333

[56] References Cited
U.S. PATENT DOCUMENTS

| | | | |
|---|---|---|---|
| 4,206,318 | 6/1980 | Steely | 379/58 |
| 4,653,094 | 3/1987 | Rasmussen et al. | 379/376 |
| 4,788,588 | 11/1988 | Tomita | 340/700 |
| 4,860,336 | 8/1989 | D'Avello et al. | 379/63 |

FOREIGN PATENT DOCUMENTS 63-34442  2/1987  Japan .
62-106439  5/1987  Japan .
63-290438  11/1988  Japan .

Primary Examiner—Jeffery A. Brier
Attorney, Agent, or Firm—Laff, Whitesel, Conte & Saret

[57] ABSTRACT

A vehicle-mounted telephone or similar small-sized equipment having a handset with a liquid crystal display (LCD) and a cradle for holding the handset in place. Sensor is built in at least one of the handset and cradle to determine whether or not the handset is present on the cradle. In response to a sense output of the sensor, a controller varies drive voltage which is applied to an LCD driver and thereby varies the visual angle of the LCD automatically. The drive voltage selectively has a first value associated with a first visual angle which occurs when the handset is mounted on the cradle and a second value associated with a second visual angle which occurs when the handset is removed from the cradle. The controller further controls the drive voltage in such a manner as to selectively apply drive voltage associated with any of a desired number of visual angles to the LCD driver. An implementation is provided for allowing a person to manually change the drive voltage in a stepless or analog fashion as desired.

8 Claims, 6 Drawing Sheets 5,034,734

SMALL-SIZED EQUIPMENT CAPABLE OF AUTOMATICALLY CHANGING THE VISUAL ANGLE OF ITS LIQUID CRYSTAL DISPLAY

BACKGROUND OF THE INVENTION

The present invention relates to small-sized equipment having a liquid crystal display (LCD) such as a radio telephone mounted on a motor vehicle and, more particularly, to small-sized equipment capable of switching over the visual angle of its LCD automatically.

An LCD has various advantages as well known in the art and are extensively used in a variety of fields today. Concerning the display surface of an LCD, the visual field angle remains substantially constant even when the visual angle to the display surface is changed. The visual angle, however, varies with the voltage which is applied to the LCD for driving it. When the small-sized equipment with an LCD is implemented as a desk-top portable word processor or similar apparatus, the visual angle of the LCD is not so critical. On the other hand, when it comes to a vehicle-mounted telephone or similar miniature equipment which is made up of a handset with an LCD and a cradle for mounting the handset thereof, the visual angle has to be considered with respect to the least two different conditions: a condition in which the handset is mounted on the cradle and a condition in which the handset is removed from the cradle by hand. Heretofore, this kind of consideration has not been reported at al. In fact, it has been customary to to provide even the equipment of the type which a person is incapable of seeing in one direction at all times with only single most effective visual angle which is expected under particular conditions of use.

SUMMARY OF THE INVENTION

It is therefore an object of the present invention to provide small-sized equipment having a capability of automatically switching over the visual angle of its LCD depending upon the condition in which handset of the equipment is used.

It is another object of the present invention to provide generally improved small-sized equipment with an LCD.

Small-sized equipment having an LCD of the present invention comprises a hand-held portable unit on which the LCD is mounted, a support for holding the portable unit when the portable unit is mounted on the support, a sensor built in at least one of the portable unit and support for determining whether or not the portable unit is mounted on the support and producing a sense signal, and a control provided in the portable unit for varying the visual angle of the LCD in response to the sense signal from the sensor.

BRIEF DESCRIPTION OF THE DRAWINGS

The above and other objects, features and advantages of the present invention will become more apparent from the following detailed description taken with the accompanying drawings.

DESCRIPTION OF THE PREFERRED EMBODIMENTS

Figure 1:
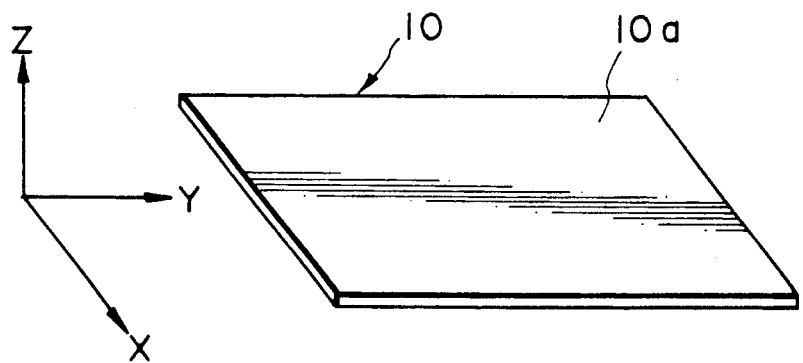
FIGS. 1 and 2 are views useful for understanding a relationship between visual angle and visual field angle of an LCD.
Figure 2:
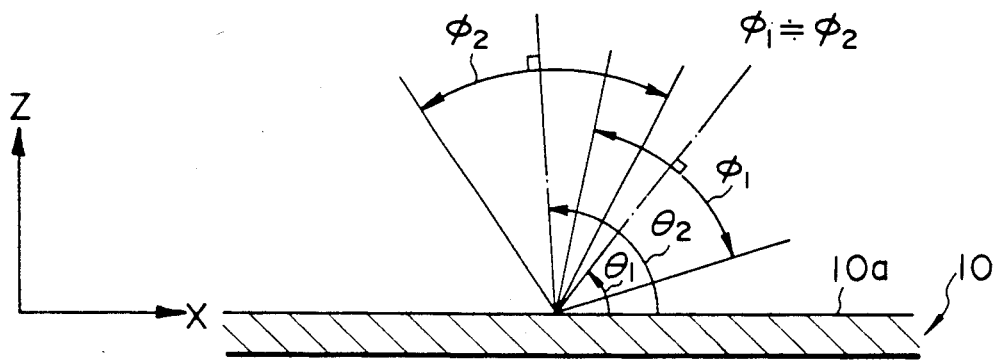
Figure 3:
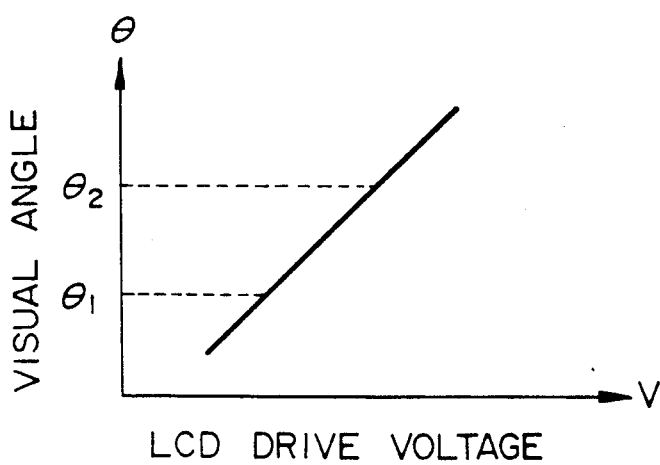
FIG. 3 is a plot representative of a relationship between visual angle and LCD drive voltage.

Referring to FIGS. 1 and 2 of the drawings an LCD 10 having a display surface 10a is shown. Concerning the display surface 10a, the visual field angle for a visual angle of $\theta_1$ by way of example is $\phi_1$. When the visual angle $\theta_1$ is changed to $\theta_2$ ($\theta_2$) $\theta_1$), the bisector of the visual field angle $\phi_1$ changes to the bisector of the angle $\phi_2$. However, the visual field angle $\phi_2$ is substantially the same as the visual field angle $\phi_1$, i.e., the visual field angle substantially remains the same despite the change of visual angle. On the other hand, as shown in FIG. 3, the visual angle $\theta$ varies with the voltage which is applied to the LCD 10 for driving it.

Considering the fact stated above, the present invention provides a technique for allowing the visual angle of an LCD to be automatically switched over as needed. Preferred embodiments of the present invention which implement such an automatic visual angle switching capability will be described in detail hereinafter.

FIRST EMBODIMENT

Figure 4:
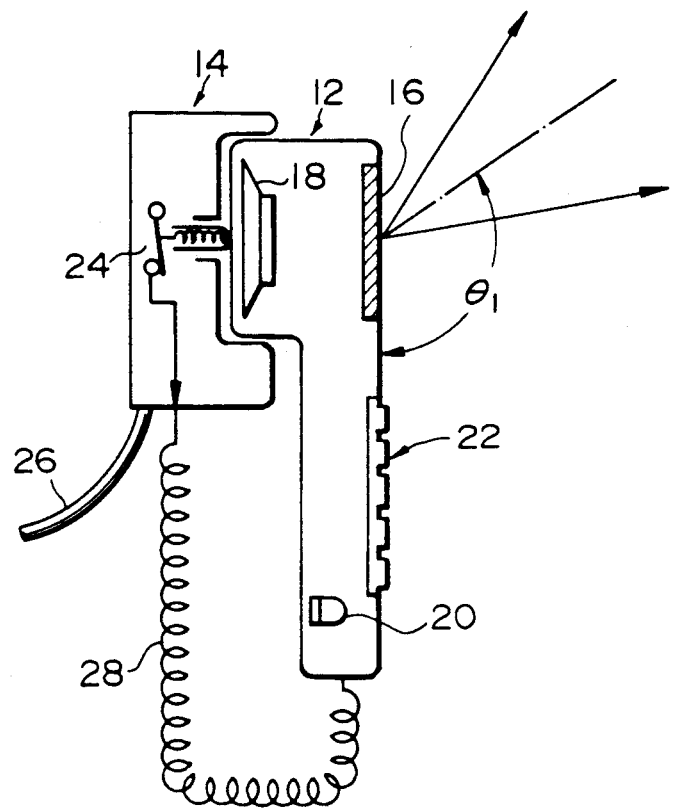
FIGS. 4 and 5 are views of small-sized equipment embodying the present invention in the form of a vehicle-mounted telephone and each showing hand set of the telephone in a different position relative to a cradle.
Figure 5:
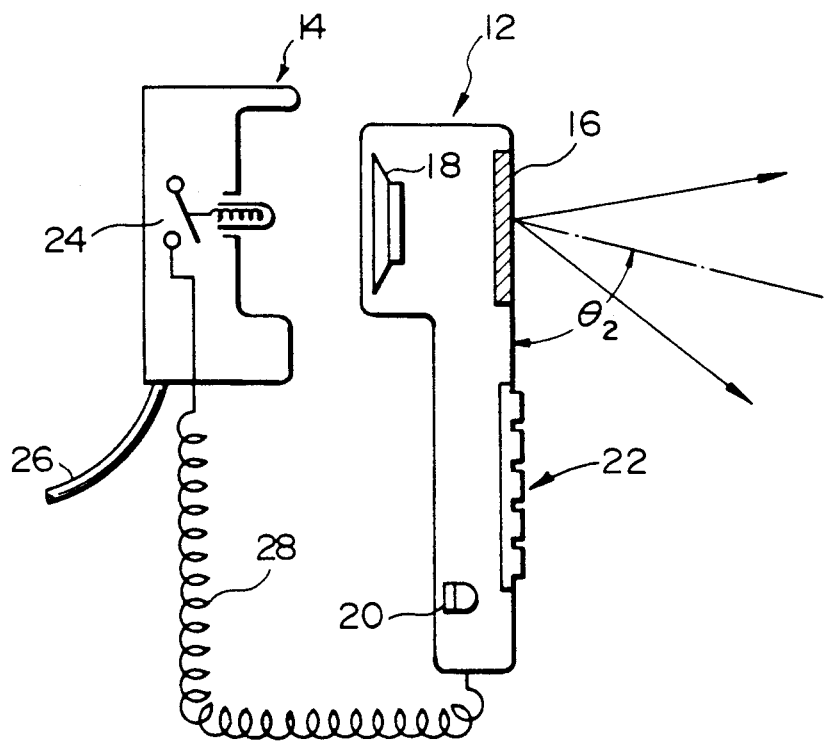
Figure 6:
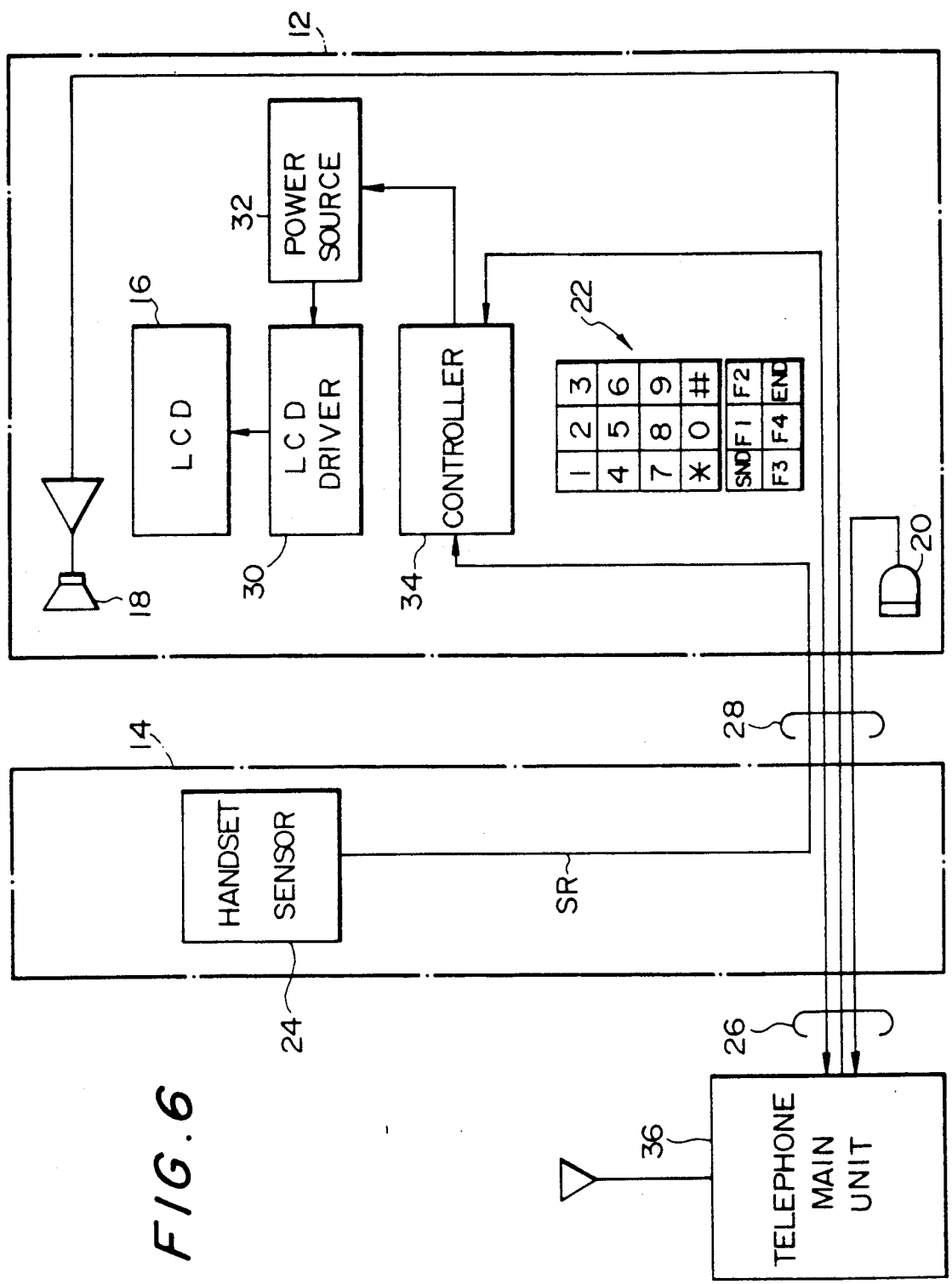
FIG. 6 is a view showing a more specific construction of the handset and that of the cradle which are included in the embodiment of FIGS. 4 and 5.

A first and comparatively fundamental embodiment of the present invention will be described first, assuming that the small-sized equipment comprises a vehicle-mounted telephone. As shown in FIGS. 4 and 5, the telephone is made up of a handset 12 and a cradle 14 for mounting the handset 12. The handset 12 has an LCD 16, a speaker 18 associated with a receiver, a microphone 20 associated with a transmitter, a keypad 22 including numeral keys and function keys, and a drive control section which will be described. The cradle 14 has a sensor in the form of a hook switch 24 for determining whether or not the handset 12 is mounted on the cradle 14, and an extension cable 26 connected to the main unit 36 of the telephone (FIG. 6). The hook switch 24 is connected to the drive control section of the handset 12 by a curl cord 28. FIG. 6 shows a more specific construction of the handset 12 and that of the cradle 14. In FIG. 6, the handset 12 has an LCD driver 30 for driving the LCD 16, a power source 32 for applying voltage to the LCD driver 30, and a controller 34 for controlling the voltage of the power source 32. The hook switch or handset sensor 24 of the cradle 14 is connected to the controller 34. The speaker 18 and microphone 20 are connected to the telephone main unit 36 by the curl cord 28 and extension cable 26.

In operation, assume that when the handset 12 is mounted on the cradle 14 as shown in FIG. 4, the handset sensor 24 delivers a signal SR representative of such an on-hook condition to the controller 34 (the hook switch constituting the sensor 24 is assumed to be closed then). In response, the controller 34 controls the power supply 32 such that the drive voltage being applied to the LCD driver 30 has a particular value (e.g. $V_1$) which is associated with the visual angle $\theta_1$ shown in FIG. 4. On the other hand, when the handset 12 is removed from the cradle 14 by hand as shown in FIG. 5, the sensor 24 delivers a signal representative of such an off-hook condition to the controller 34 (at this instant, the hook switch is open). Then, the controller 34 controls the power source 32 such that the drive voltage being applied to the driver 30 has another particular value (e.g. $V_2$) which is associated with the visual angle $\theta_2$ shown in FIG. 5. In this manner, the visual angle is automatically switched over depending upon the position of the handset 12, i.e., whether it is mounted on the cradle 14 or held by hand off the cradle 14.

The relationship between the visual angles $\theta_1$ and $\theta_2$ shown in FIGS. 4 and 5 and the drive voltages $V_1$ and $V_2$ will be discussed more specifically.

Figure 7:
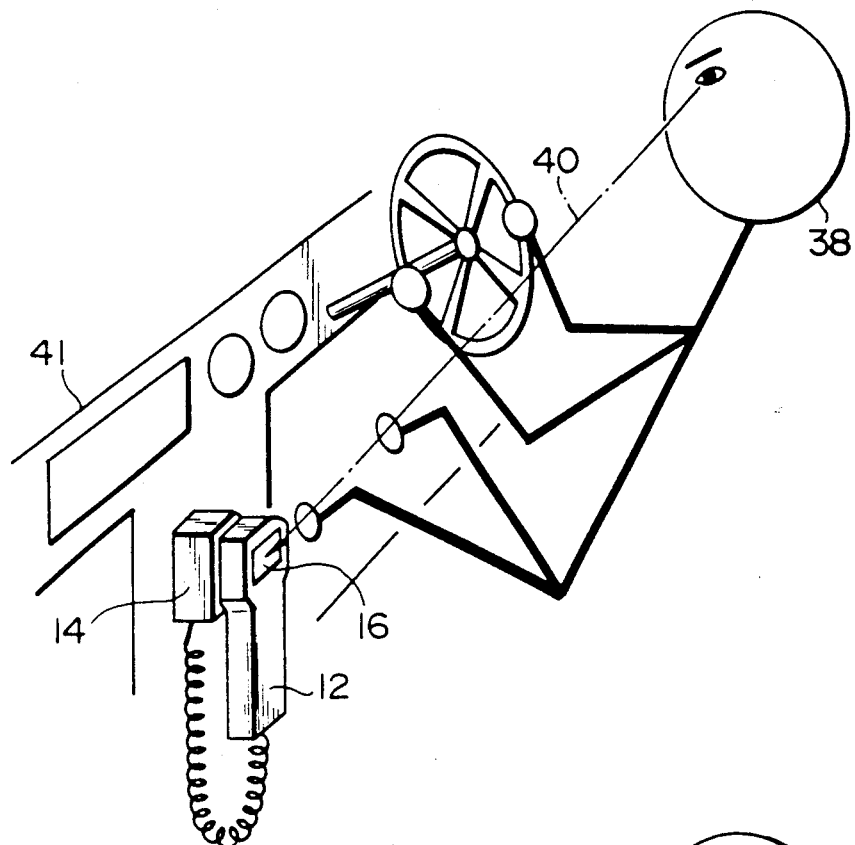
FIGS. 7 and 8 are views showing the hand set and cradle of the illustrative embodiment which are mounted in the passenger compartment of a motor vehicle, and a different directions in which the operator of the vehicle may look at the display surface of the handset.
Figure 8:
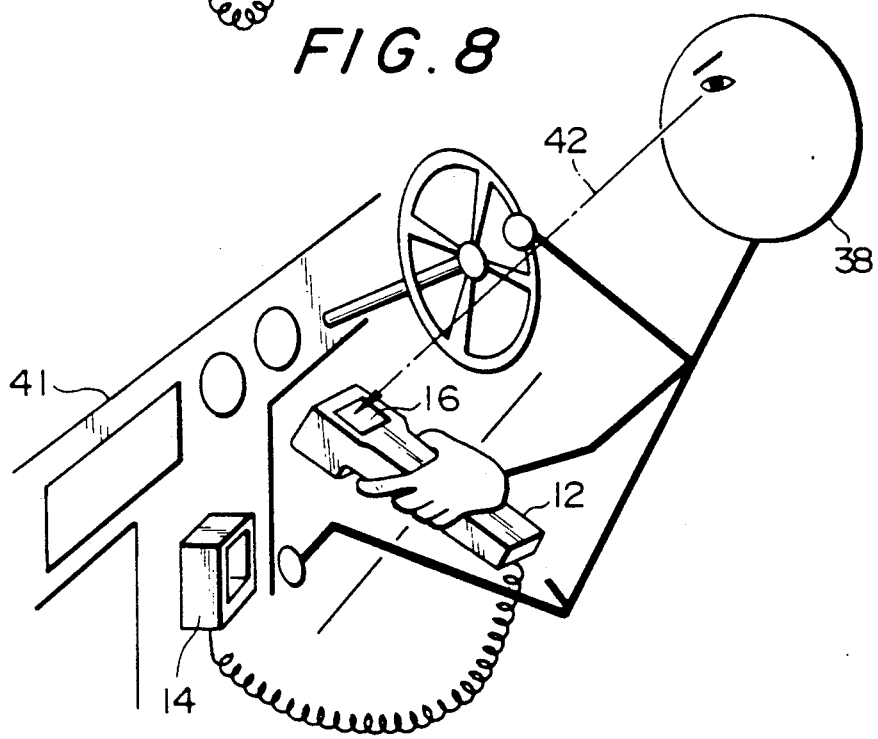

FIGS. 7 and 8 show a telephone disposed in the passenger compartment of a motor vehicle and the change of direction in which the operator 38 of the vehicle looks at the LCD 16. AS shown, while the handset 12 is mounted on the cradle 14 fixed to the dashboard 41 of the motor vehicle (FIG. 7), the operator will look at the LCD 16 in a direction 40. This direction 40 is different for a direction 42 in which the operator will look at the LCD 16 when he or she holds the handset 12 by hand off the cradle 40 (FIG. 4). Such a different is ascribable to the distance between the LCD 16 and the operator's eyes as well as to the position of the handset 12. In the illustrative embodiment, the drive voltage $V_1$ is applied to the LCD driver 30 when the handset 12 is placed on the cradle 14 so as to set up the visual angle $\theta_1$; the drive voltage $V_2$ is applied to the LCD driver 30 when the handset 12 is removed from the cradle 14 so as to set up the visual angle $\theta_2$. Here, $V_1$ is greater than $V_2$ and $\theta_1$ is greater than $\theta_2$. The visual angles $\theta_1$ and $\theta_2$ are of course determined on the basis of the positional relationship between the operator 38 and the LCD 16. Usually, the handset 2 is left in a substantially vertical position (FIG. 7) while mounted on the cradle 14 and in a substantially horizontal position when removed from the cradle 14 (FIG. 8). The visual angle $\theta_2$ therefore should preferably be determined such that the handset 12 is easy to see when held in a substantially horizontal position.

As stated above, the drive voltages $V_1$ and $V_2$ are selectively applied to the LCD driver 30 so that the visual angle $\theta_1$ shown in FIG. 4 and the direction 40 shown in FIG. 7 and the visual angle $\theta_2$ shown in FIG. 5 and the direction 42 shown in FIG. 8 may individually substantially coincide with each other.

While the sensor responsive to the presence/absence of the handset 12 on the cradle 14 has been shown and described as being implemented by the hook switch 24 which is built in the cradle 14. The hook switch 24 may be replaced with any other type of sensor having a similar function. Further, this sensor may even be built in the handset 12, if desired.

SECOND EMBODIMENT

An alternative embodiment of the present invention which is also implemented as a vehicle-mounted telephone by way of example will be described with reference to FIGS. 9 to 11. In the figures, the same or similar structural elements as those of the first embodiment are designated by like reference numerals.

Figure 9:
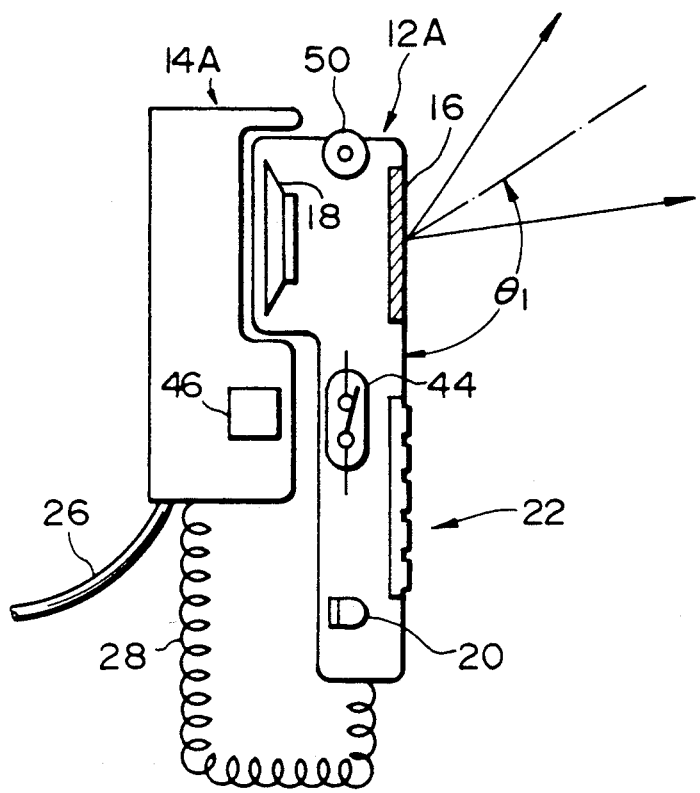
FIGS. 9 and 10 are views showing an alternative embodiment of the present invention.
Figure 10:
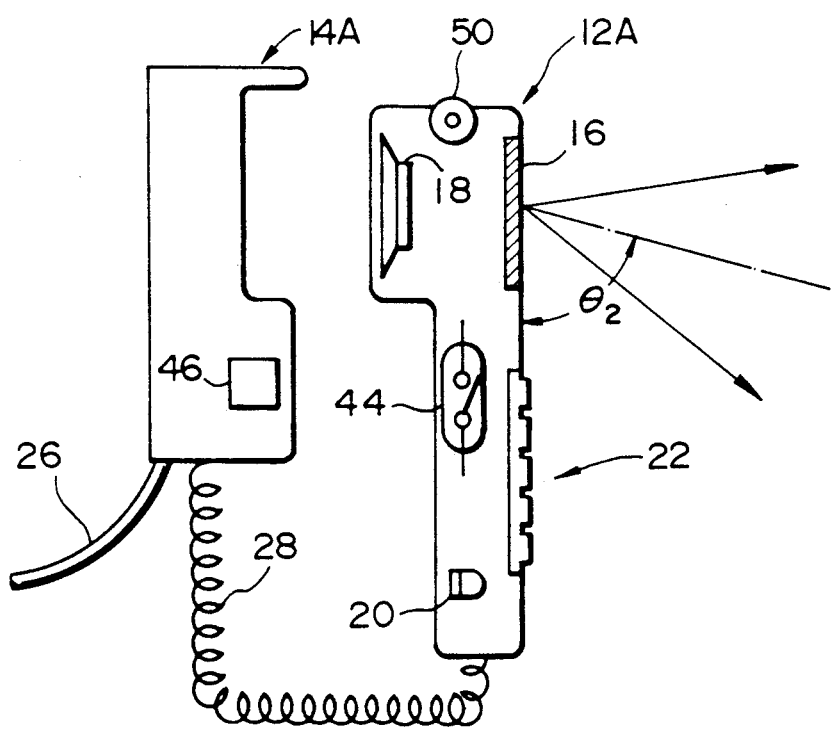

As shown in FIGS. 9 and 10, the handset 12A has the LCD 16, speaker 18, microphone 20, keypad 22 including numeral keys and function keys, and drive control section which will be described. The cradle 14A is provided with the extension cable 26 and curl cord 28 which are connected to the telephone main unit 36 (FIG. 11). In this particular embodiment, the handset sensor is constituted by a reed switch 44 and a magnet 46 which are built in the handset 12A and the cradle 14A, respectively.

Figure 11:
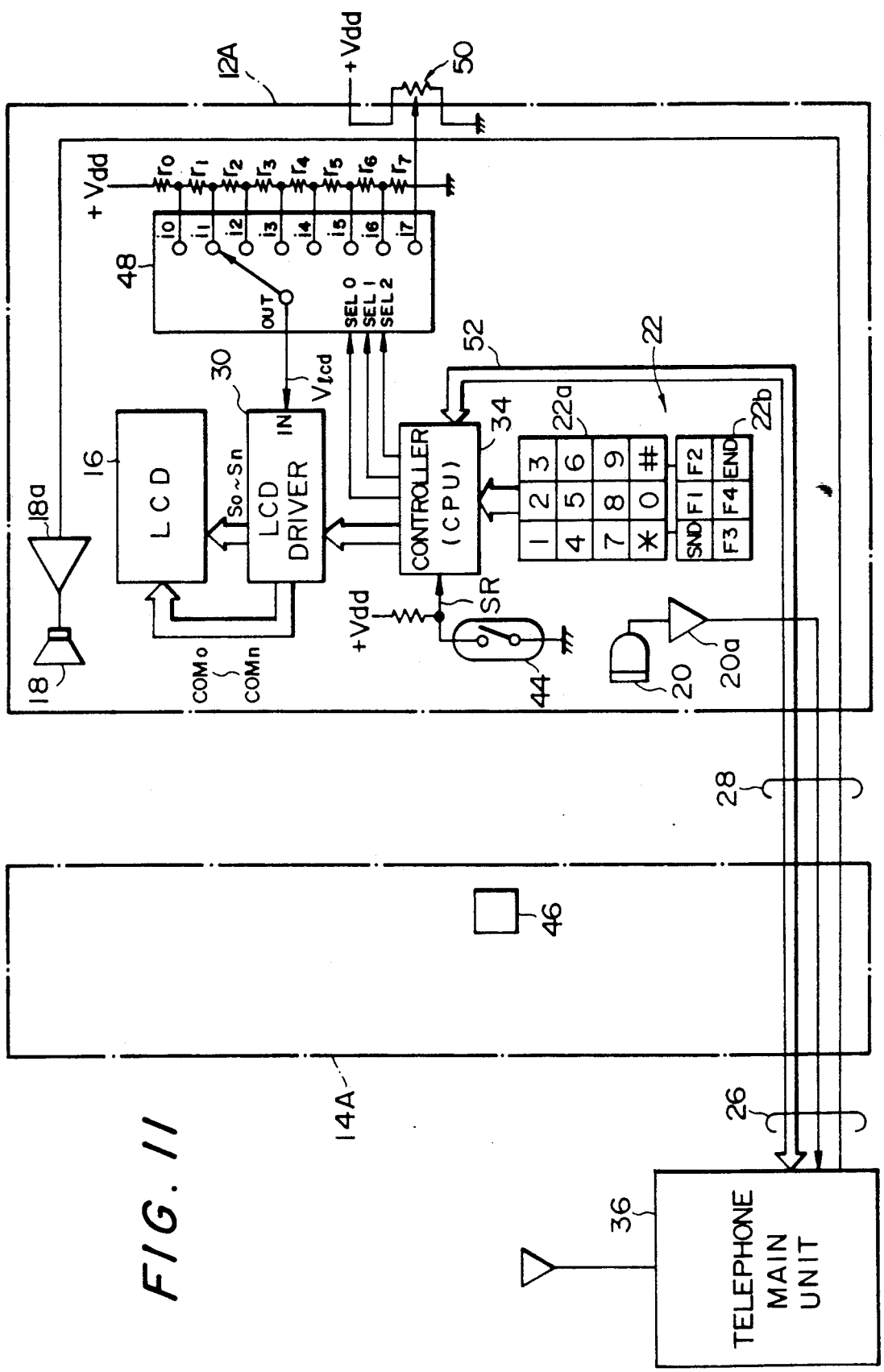
FIG. 11 is a view showing a specific construction of a handset and that of a cradle of the embodiment shown in FIGS. 9 and 10.

FIG. 11 shows a more specific construction of the handset 12A and that of the cradle 14A. The handset 12A is provided with a drive control section for controllably driving the LCD 16. Specifically, the drive control section is made up of the LCD driver 30, an analog switch 48, and the controller 34. Implemented by an 8-channel multiplexer, for example, the analog switch 48 adequately selects one of a plurality of source voltages Vdd to apply a desired drive voltage Vlcd to the LCD driver 30. The controller 34 in the form of a CPU, for example, receives an output signal SR of the reed switch or handset sensor 44 and in response delivers multiplexer selection signals SEL0, SEL1 and SEL2 to the analog multiplexer or switch 48. The LCD driver 309 feeds segment signals $S_0$ and $S_n$ and common signals $COM_0$ to $COM_m$ to the LCD 16 for driving it. The keypad 22 is provided with numeral keys 22a and function keys 22b and connected to the controller 34. More specifically, the multiplexer 48 includes voltage dividing resistor $r_0$ and $r_7$ which are connected to terminals $i_0$ to $i_7$ as illustrated, so that the source voltage Vdd may be divided to preset the drive voltage Vlcd, i.e., visual angle at any of seven consecutive steps. More specifically, the source voltage Vdd is divided by the resistors $r_0$ to $r_7$ and the resulting voltage is fed from the analog switch 48 in the form of the drive voltage Vlcd. Table 1 shown below indicates how the drive voltage Vlcd is changed depending upon the logical states of the multiplexer selection signals SEL2. SEL1 and SEL0.

TABLE 1

| SEL2 | SEL1 | SEL0 | PATH IN ANALOG SWITCH 48 |
|---|---|---|---|
| 0 | 0 | 0 | $i_0 \rightarrow$ Vlcd OUT |
| 0 | 0 | 1 | $i_1 \rightarrow$ Vlcd OUT |
| 0 | 1 | 0 | $i_2 \rightarrow$ Vlcd OUT |
| 0 | 1 | 1 | $i_3 \rightarrow$ Vlcd OUT |
| 1 | 0 | 0 | $i_4 \rightarrow$ Vlcd OUT |
| 1 | 0 | 1 | $i_5 \rightarrow$ Vlcd OUT |
| 1 | 1 | 0 | $i_6 \rightarrow$ Vlcd OUT |
| 1 | 1 | 1 | $i_7 \rightarrow$ Vlcd OUT |

As shown in Table 1, the source voltage Vdd is divided by any of the voltage dividing resistor $r_0$ to $r_7$ and terminals $i_0$ to $i_7$ depending upon the logical states of the multiplexer selection signals SEL0, SEL1 and SEL2. In this embodiment, therefore, the drive voltage Vlcd is variable over seven consecutive steps. Stated another way, this embodiment not only allows two different visual angles $\theta_1$ and $\theta_2$ (see FIGS. 9 and 10) to be selectively and automatically set up but also allows a person to change desired independent visual angles each over seven steps by manipulating the keypad 22 which is connected to the controller 34. The present visual angles are stored in the controller 34 and therefore does not need any further setting operations.

As shown in FIG. 11, a variable resistor 50 is connected to the terminal $i_7$ of the analog switch 48 so that the drive voltage Vlcd fed to the LCD driver 30 may be adjusted and, especially, finely adjusted by hand. Specifically, as a person operates a knob 50a (FIGS. 9 and 10) of the variable resistor or volume 50, the drive voltage Vlcd is varied in a stepless or analog fashion to set up a desired visual angle.

In FIG. 11, a speaker amplifier 18a is connected to the speaker 18 and, by the curl cord 28 and extension cable 26, connected to the telephone main unit 36. Likewise, a microphone amplifier 20a is connected to the microphone 20 and, by the curl cord 28 and extension cable 26, connected to the telephone main unit 36. Further, a control bus 52 is connected between the controller 34 and the telephone main unit 36 by the curl cord 28 and extension cable 26.

It should be born in mind that the embodiments shown and described are applicable not only to a vehicle-mounted telephone but also to any kind of small-sized equipment having a handset with an LCD and a cradle for holding the handset.

In summary, it will be seen that the present invention provides small-sized equipment having an LCD the visual angle of which is variable to display clear-cut information with no regard to the position of the equipment. In addition, the equipment facilitates effective use of display such as in a real-time display mode.

Various modifications will become possible for those skilled in the art after receiving the teachings of the present disclosure without departing from the scope thereof.

What is claimed is:

1. Small-sized equipment having a liquid crystal display (LCD), comprising:
   a hand-held portable unit on which said LCD is mounted;
   support means for holding said portable unit when said portable unit is mounted on said support means;
   sensor means built in at least one of said portable unit and said support means for determining whether or not said portable unit is mounted on said support means and producing a sense signal; and
   control means provided in said portable unit for varying a visual angle of said LCD in response to the sense signal from sensor means.

2. Equipment as claimed in claim 1, wherein said sensor means comprises a hook switch built in said support means.

3. Equipment as claimed in claim 1, wherein said sensor means comprises a reed switch built in said hand-held portable unit and a magnet built in said support means.

4. Equipment as claimed in claim 1, wherein said control means comprises:
   a driver for driving said LCD;
   a power source for feeding power to said driver; and
   a controller for controlling said power source such that a first drive voltage associated with a first visual angle is fed to said driver when the sense signal from said sensor is representative of presence of said portable unit on said support means, and a second drive voltage associated with a second visual angle is fed to said driver when the sense signal is representative of absence of said portable unit on said support means.

5. Equipment as claimed in claim 1, wherein said control means comprises:
   a driver for driving said LCD;
   an analog switch for producing a plurality of drive voltages which are selectively applied to said driver; and
   a controller for controlling said analog switch such that one of the drive voltages which is associated with a desired visual angle is selected and outputted by said analog switch in response to the sense signal from said sensor means.

6. Equipment as claimed in claim 5, wherein said analog switch comprises a multi-channel multiplexer.

7. Equipment as claimed in claim 6, wherein said control comprises a central processing unit.

8. Equipment as claimed in claim 5, wherein said control means further comprises manual drive voltage varying means accessible for manually varying the drive voltage fed to said driver in an analog fashion.

* * * * *